United States Patent [19]
Whitney et al.

[11] 3,729,669
[45] Apr. 24, 1973

[54] FINE-COARSE POSITION INDICATING SYSTEM

[75] Inventors: Charles A. Whitney, Canton; James P. Somerset, Wethersfield; Randal B. Hathway, Thomaston, all of Conn.

[73] Assignee: The Superior Electric Company, Bristol, Conn.

[22] Filed: Oct. 29, 1970

[21] Appl. No.: 84,977

[52] U.S. Cl. ................318/594, 318/640, 318/685
[51] Int. Cl. ..............................................G05b 11/18
[58] Field of Search......................318/594, 640, 685

[56] References Cited

UNITED STATES PATENTS

| | | | |
|---|---|---|---|
| 3,004,251 | 10/1961 | Rapacz | 318/594 X |
| 3,566,239 | 2/1971 | Taniguchi | 318/640 X |
| 3,465,220 | 9/1969 | Rabian et al. | 318/594 |
| 2,987,661 | 6/1961 | Schweitz | 318/594 |
| 3,394,248 | 7/1968 | Ogden | 318/640 X |

Primary Examiner—T. E. Lynch
Attorney—Johnson & Kline

[57] ABSTRACT

A system for providing a signal that a worktable is at a location when the worktable is driven along two coordinants by a pair of motors by concurrently sensing the actual worktable position and one rotational position of each motor. Relatively non-precise switch means are used for sensing the location of the worktable within an area that is less than the movement produced by one revolution while a shaft decoder connected to each motor senses the rotational position of the motor with simultaneous indications from the three sensing sources enabling the precise determination of the worktable position. The system may be used to prevent further automatic movement of the member when the motors are controlled by a numerical controlled system.

11 Claims, 6 Drawing Figures

Patented April 24, 1973  3,729,669

INVENTORS
Charles Whitney
James Somerset
Randal Hathway

BY Johnson and Kline
ATTORNEYS

FINE-COARSE POSITION INDICATING SYSTEM

In many instances where it is desired to produce a plurality of identical workpieces by using a numerical controlled machine tool, the coded commands consisting of a plurality of movements and operations on the workpiece may be utilized. The same commands are repeated for each workpiece and if the member is a worktable and each workpiece is identically positioned thereon, then each workpiece will receive the same movements and operations. However, it is required that the worktable be positioned at the same location at the start of the commands and hence it has been found to be desirable to provide a signal prior to the beginning of the commands if the worktable is so located. Normally this has heretofore required quite accurate devices for precisely measuring the worktable's location especially when the location is required to be measured within the resolution of the numerical controlled system which may be, for example, 0.001 or 0.0005 inches. However, these devices have not found ready acceptance because they not only have been quite expensive but also have been difficult to adjust and maintain, limiting as to the choice of the location sensed and somewhat complicated to shift to other and different locations.

Though one specific desired use has been mentioned with respect to repeating a sequence of commands, it will be understood that the system may be used in other areas where it is desired to provide an indication of the attaining of a precise location by a movable member.

It is accordingly an object of the present invention to provide a position indicating system for producing an indication of a member being at a precise location which obviates the above-noted deficiencies in heretofore known systems.

Another object of the present invention is to provide a position indicating system that is quite economical to manufacture, capable of being interconnected with presently existing numerical controlled systems such as those using stepping motors, reliable in use and easily shifted to different locations.

A further object of the present invention is to provide a system for indicating if a member is at a selected location when the member is moved linearly by a rotating motor by providing a signal when there concurrently occurs an indication that the member is in an area that is less than the movement produced by one revolution of the rotating motor and an indication that the motor is at the one rotational position which causes the member to be at the selected location.

Still another object of the present invention is to provide an encoder that is capable of being interconnected with a stepping motor and adjusted to provide a signal at any one of the stable positions that occur in one revolution of the motor.

In the specific embodiment of the invention hereinafter described, the position indicating system is disclosed with a numerical control system having a pair of stepping motors that are interconnected with a worktable so that one motor linearly moves the worktable along one axis and the other motor similarly linearly moves the worktable along another axis perpendicular thereto. The numerical control system may have coded commands for providing one or more movements of the worktable with the final movement of the worktable causing it to be at a desired location. This may be the starting position for the next sequence of movements and the numerical control system includes a start button which must be actuated to initiate further movements. The position indicating system is interconnected with the start button such that the latter cannot effect further movements unless the position indicating system indicates that the worktable is at the desired location.

The system signal is derived from the simultaneous occurrence of an indication from a coarse location indicator and an indication from two fine location indicators. The former indicator senses the actual position of the worktable and provides an indication if the worktable is approximately at the desired location. Specifically, the coarse indicator includes a mechanically operated switch and an actuator therefor with the switch being mounted on a stationary base and the actuator being carried by the worktable. The actuator operates the switch only when the worktable is located in an area that includes the desired location, with the area having dimensions that are less than the distance which each of the motors can move the worktable in one revolution.

Each of the two fine position indicators consists of a shaft encoder connected on the shaft of its respective motor and each operates to provide an indication each time the motor is at one rotative position. Specifically, each encoder includes a photo-responsive cell which is positioned between a source of light and a disk that is rotated with the shaft. The disk includes one slit which has a width less than the rotational movement corresponding to one step of the motor. Only when the slit is located between the light source and the photo-electric cell is light passed to alter the condition of the photocell to accordingly provide an indication that the shaft is at its one rotative position.

In use, the coarse indicator and the two fine indicators are serially connected together such that a position signal indicating that the worktable is at the desired location only occurs when an indication is simultaneously present from all three sources. While the combined signal may be utilized in any desired manner it has been found advantageous to employ the signal in series with a command derived by manual operation of a start button on the numerical control system. The start button is normally capable of initiating the sequence of operation on the coded tape but by being in series with the position indicating system, it can only start if the position indicating system indicates that the worktable is at the desired location. Accordingly, subsequent operation of the worktable by the numerical control system is prevented if the worktable is not positioned at the desired location.

Other features and advantages will hereinafter appear.

Figure 1:
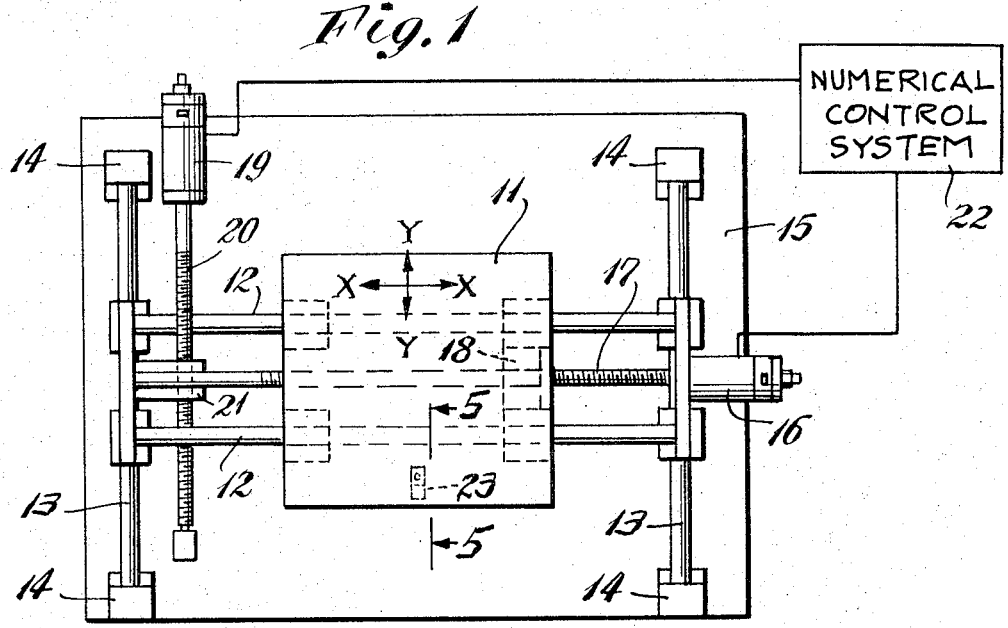
FIG. 1 is a plan of a worktable moved by a numerical controlled system and including the position indicating system of the present invention.

Referring to the drawing, the present invention of a position indicating system is usable with a member such as a worktable 11 that is mounted on guides 12 for movement along an X axis and guides 13 for movement along a Y axis. Posts 14 that are upstanding from a base 15 support the guides 13 while the guides 12 are supported by linear bearings on the guides 13 to move thereon. The extent of movement along the X axis of the worktable 11 is controlled by an X axis motor 16 which is connected to drive a threaded rod 17 which cooperates with a back-lash free threaded nut 18 carried by the worktable. Accordingly, only rotation of the rod 17 by the motor 16 will move the worktable along the X axis.

Similarly, a Y axis motor 19 is connected to a threaded rod 20 which cooperates with a back-lash free threaded nut 21 that moves with the guides 12 to control movement of the worktable along the Y axis. As shown by the block 22, there is a numerical control system connected to the motors 16 and 19 with the system accepting commands such as those from punched tape and translating the commands into linear movement of the table along the two axes.

One type of numerical control system which may be employed is disclosed in U.S. Pat. No. 3,466,515, assigned to the assignee of the present invention. The motors 16 and 19 in this system are stepping motors that produce steps or rotational increments of movement with each step being of essentially the same length. Each motor step is translated by the threaded rods and nuts into a linear movement of the worktable 11. Specifically, the motors may have 200 steps per revolution while the ratio between the rods and nuts may be 5–1 or 10–1 producing for each motor step, a linear increment of the table of 0.001 or 0.0005 inch. The system has a preciseness of movement within the movement produced by one step of the motors and hence for the position indicating system to have the same preciseness it must provide an indication of the worktable position only when the worktable is less than one step of movement away from the selected location on both axes.

To achieve this preciseness, the present position indicating system includes a coarse position indicator which provides an indication only when the worktable is located approximately at the selected location. The coarse position means includes a mechanically actuated snap action switch 23 which is secured as by screws 24 to the base 15 and has an actuating button 25 positioned to be in the path of an actuator 26 carried by the worktable 11.

The actuator has a length which enables its bottom 26a to engage the button 25 when encountering it to cause it to be depressed to change the normal condition of the switch 23 and to maintain it in this condition while it so engages the button 25. By properly dimensioning the bottom 26a of the actuator in conjunction with the shape of the top of the button, it is thus possible to regulate the area over which the worktable can move while still maintaining the switch 23 actuated. Thus, while the maximum limit of the area is the amount of movement which the motors produce for not quite one revolution there is basically no minimum area which is required and a circular area having a diameter approximately one-half the length of the movement for one revolution has been found acceptable. The switch 23 and actuator 26 need not be so precisely located as to have the selected location be exactly in the middle of the actuated area, however, it must be in the area, preferably around the middle.

It has also been found desirable to somewhat round off the bottom of the actuator 26 and the top of the button in order to provide a wedging action when the two parts meet to thereby enable the actuator to engage and depress the button from any direction.

Figure 2:
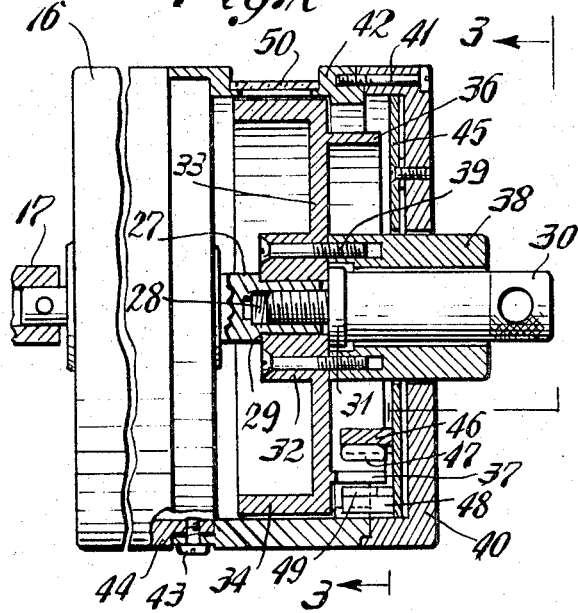
FIG. 2 is a section of the fine position indicator.
Figure 3:
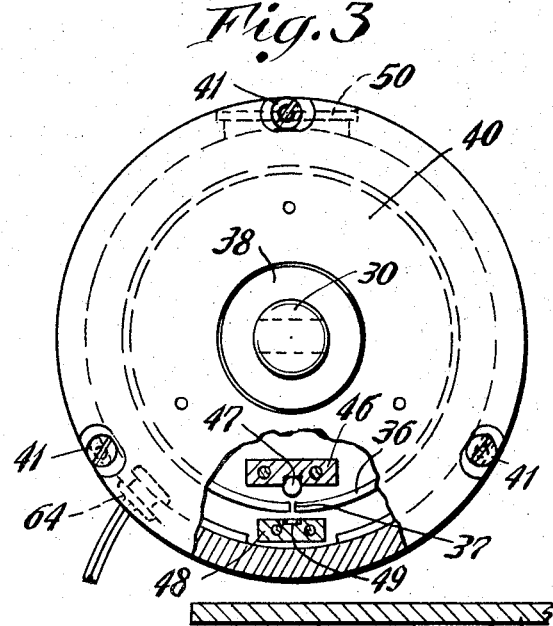
FIG. 3 is an end view taken on line 3—3 of FIG. 2.

Shown in FIG. 2 is a cross-section of the fine position indicator attached to the motor 16. It will also be appreciated that there is an identical fine position indicator connected to the motor 19. The shaft of the motor 16 extends from both ends thereof having one end connected to the rod 17 while the other end 27 protrudes oppositely therefrom. The end 27 has an interiorly threaded bore 28 and an exterior flange 29. A locking stud 30 has a threaded portion which threads into the bore 28 and a flange 31. The flanges 29 and 31 serve to clamp therebetween a hub 32 of a disk 33 to the motor shaft. It will be understood that the disk 33 may be relatively rotated with respect to the shaft 27 when the locking stud 30 is loose but may be clamped at any desired position on the shaft 27 by tightening the stud 30.

Figure 4:
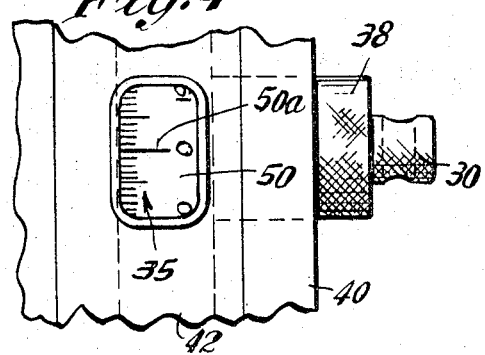
FIG. 4 is a partial plan of the fine position indicator.
Figure 5:
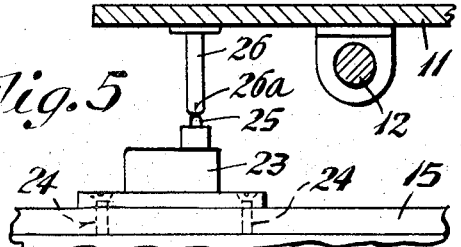
FIG. 5 is a section, somewhat enlarged taken along the lines 5—5 of FIG. 1.

The disk 33 includes an inwardly directed peripheral portion 34 with indicia 35 (FIG. 4) marked thereon while an outwardly directed flange 36 is circular except for a slit 37 formed therein. In addition for enabling a user to manually rotate the disk there is provided an adjusting sleeve 38 connected to the disk as by screws 39.

Portions of the adjusting sleeve and the locking stud 30 project beyond an end cover 40 that is secured as by screws 41 to a tubular member 42 which is fastened as by screws 43 to the frame 44 of the motor 16. Positioned adjacent and slightly spaced from the interior of the end cover 40 is a printed circuit board 45 which carries a holder 46 that supports an electric bulb 47. Outwardly of the holder 46 is another holder 48 in which a photocell 49 is mounted. The photocell 49 is mounted to be radially aligned with the bulb 47 and the outwardly extending flange 36 is adapted to pass therebetween and serves to block light from the bulb from impinging on the photocell. However, light can pass to the photocell whenever the slit 37 is positioned between the bulb and cell. The width of the slit is such as to permit light to impinge on the cell for an angular movement of the disk 33 and motor shaft that is less than the angular movement produced by one step. Also, if desired, the movement may be further reduced not only by decreasing the width of the slit but also by limiting the receptive area of the photocell through the use of an opaque screen (not shown) having a transparent slit parallel with the slit 37.

In use, the worktable 11 is moved to the desired location and the switch 23 is secured on the base 15 at a position where the middle of the actuation area corresponds substantially with the center line of the actuator 26. Each fine position indicator is adjusted by loosening the locking stud 30, rotating the disk 33 until the zero indicia appears through a window 50 formed in the tubular member 42 to be aligned with a cursor line 50a. The locking stud 30 then clamps the disk to the shaft at this position when the slit is directly opposite the zero indicia. If necessary, the end cap 40 may be adjusted by loosening screws 41 and relatively rotating it with respect to the tubular member until the photocell and bulb are accurately aligned with respect to the slit 37. As the motor 16 is a stepping motor having stable places between steps, the slit is adjusted to be at the stable position which places the worktable at the desired location.

Figure 6:
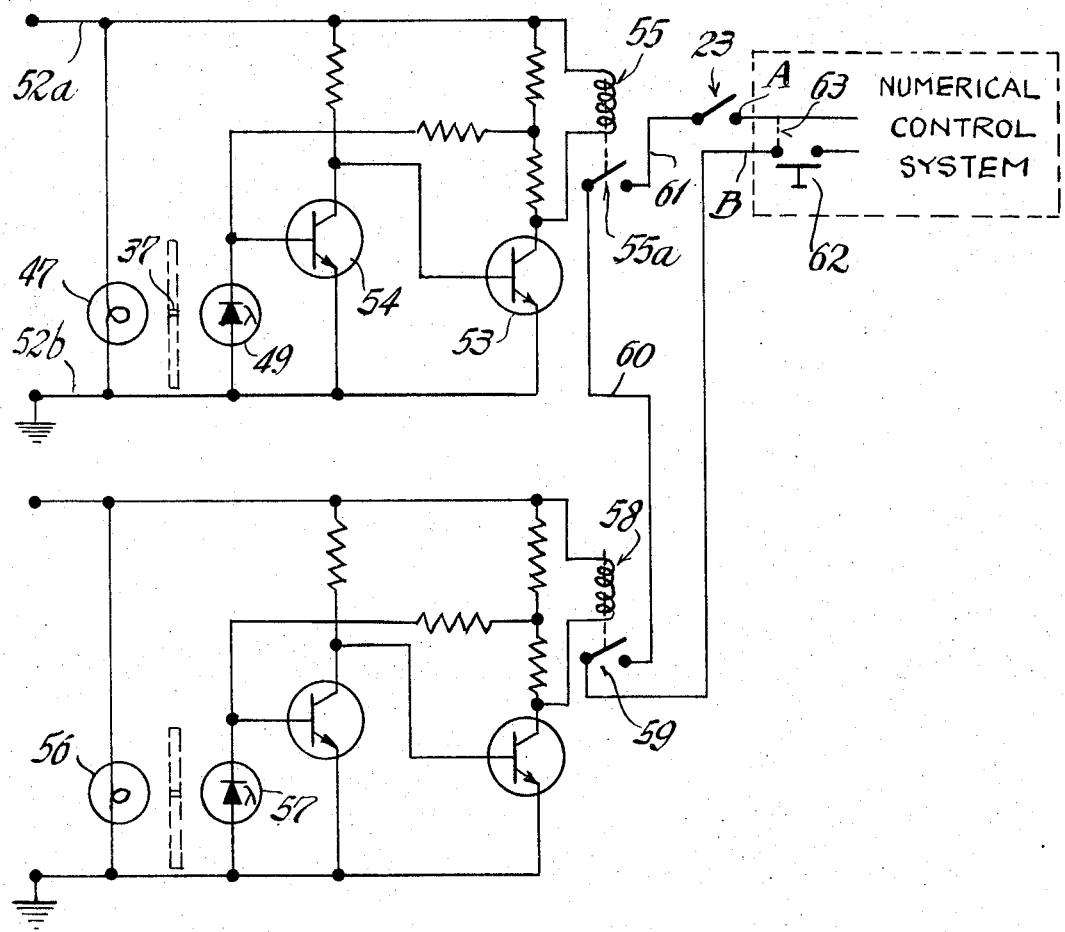
FIG. 6 is an electrical schematic diagram of the electrical components of the present invention shown incorporated with the numerical control system.

Referring to FIG. 6, there is shown an electrical schematic diagram of the interconnections of the electrical component parts. The bulb 47 is connected across a pair of input leads 52a and 52b which are connectible to a source of unidirectional current. The photocell 49 is connected to the lead 52b and through a resistor to the emitter of a transistor 53. The base of transistor 53 is connected to the emitter of another transistor 54 which in turn has its base connected to an end of the photocell 49. Connected between the lead 52a and the emitter of transistor 53 is a relay coil 55 which operates a normally open switch 55a.

When the resistive photocell 49 is not receiving light from the bulb 47, the transistor 54 is conducting which prevents conduction through the emitter-collector path of the transistor 53. Upon the slit 37 coming between the bulb 47 and photocell 49, the photocell's resistance decreases, causing transistor 54 to cease conducting and transistor 53 to conduct to energize relay coil 55 to close switch 55a. The transistors 53 and 54 in addition to providing amplification to supply power for the relay coil 55 also serve to square the resistive change in the photocell 49 to assure more positive operation of the circuit.

In addition to the fine position indicator connected to the motor 16 there is an identical fine position indicator connected to the motor 19 and it includes the identical components including a lamp 56, photocell 57, relay coil 58 and normally open switch 59.

As shown in FIG. 6 a lead 60 connects the switches 55a and 59 in series while a lead 61 also connects in series therewith the switch 23. Accordingly, the indication from the position indicating system that the worktable is at the selected location is a closed circuit between the points A and B which requires that all three switches be closed. At any other location, one or more of the switches will be open thereby effecting an open circuit between these points A and B.

The position indicating system may be connected to a start switch 62 in the numerical control system 20 to prevent the start switch from initiating operation of the numerical control system unless the worktable is at the desired location. In this instance, the points A and B may be connected in series with the start switch 62 and the usual connection indicated by the dotted line 63 disconnected.

Preferably, the relays 55 and 58 are of the type which may be mounted on the printed circuit board 45 and thus it and the other components of the system may be formed on the board 45 so as to render the system economical to fabricate in addition to retaining within the end cover 40 all the electrical components of the system except for the two leads which may project out from an aperture such as aperture 64 formed in the end cover and which are connected to the switch 55a.

While the position indicating system has been disclosed as being used with a numerical controlled system having stepping motors, it is contemplated that it may be used with other and different systems.

It will accordingly be appreciated that there has been disclosed a position indicating system which is capable of providing an electrical indication when a member is at a selected location. The member is moved along two perpendicular axes by a motor on each axis and the system senses the position within the preciseness with which the motors can move the member thereby not detracting from the accuracy of the system. In particular the position indicating system includes a coarse position indicator which senses the actual location of the member and provides an indication whenever the member is in an area that is less than the amount of movement which one revolution of each of the motors is capable of producing. A fine position indicator is connected to each of the motors and each provides an indication for the rotative position of each motor which causes the member to be at the selected location. At the selected location of the member, there is simultaneously produced an indication from each of the coarse and fine positioning indicators which constitute the signal from the position indicating system.

Variations and modifications may be made within the scope of the claims and portions of the improvements may be used without others.

We claim:

1. A position indicating system for providing an indication of a member movable along an axis being at a selected location on the axis comprising, means mounting the member for movement along the axis, rotatable means, means interconnecting the rotatable means and the member for translating rotational movement of the rotatable means into linear movement of the member, coarse position means including a first part and a second part with one of the parts being secured on the member for movement therewith and the other part being maintained stationary to be in the path of movement of the one part, said parts being constructed and arranged to effect an indication only for a length along the axis which is less than the linear distance which one revolution of the rotatable means moves the member and in which the selected location is within the length, fine position means connected to the rotatable means and providing an indication of only one rotatable position of the rotatable means and means for combining the indications from the coarse position means and the fine position means to effect the indication from the system only when the two indications occur simultaneously.

2. The invention as defined in claim 1 in which the selected location is approximately at the middle of the length.

3. The invention as defined in claim 1 in which the parts of the coarse position means includes an actuable switch means having a first normal condition and being shiftable to a second condition and an actuator therefor which is effective to shift the condition of the switch means when in the proximity thereof from the first to the second condition and in which being in the second condition provides the indication from the coarse position means.

4. The invention as defined in claim 3 in which the switch means is a mechanically actuated snap action switch having a movable button, in which the actuator includes a surface engageable with the button to move it and in which the cooperating button and surface are shaped to effect moving of the button only for the length along the axis.

5. The invention as defined in claim 1 in which the rotatable member is a stepping motor having a plurality of substantially equal length steps per revolution with there being a stable place between each step and in which the rotatable position is at one of the stable places.

6. The invention as defined in claim 5 in which each of the steps produces an arcuate movement of the motor and in which the rotatable position has an arcuate length less than that of one step.

7. The invention as defined in claim 6 in which the motor moves the member a linear increment along the axis for each step and in which the length during which the coarse position means provides an indication is not less than the length of a plurality of increments.

8. The invention as defined in claim 1 in which the member is mounted for movement along a second axis perpendicular to the one axis, second rotatable means, second means for interconnecting the second rotatable means to the member for translating rotational movement of the second rotatable means into linear movement of the member along the second axis, second fine position means connected to the second rotatable means and providing an indication of one rotatable position of the second rotatable means and in which the means for combining combines the three indications and produces the system indication only with the simultaneous occurrence of all three indications.

9. The invention as defined in claim 8 in which each rotatable member is a motor, numerical control means for controlling the movements of the motors and including a start means for initiating the movements and in which the system indication is interconnected with the start means to inhibit operation of the start means in the absence of the system indication.

10. A fine position means connected to a rotatable motor for providing an indication of one rotatable position of the motor comprising said motor having a shaft, means for securing a disk on said shaft for movement therewith, a source of light, a photo-responsive means positioned to receive light from said source and produce an indication when light is received and in which said disk has an annular portion formed of opaque material positioned between the light source and the photo-responsive means to block light transmitted therebetween and being formed with a transparent slit, whereby said photo-responsive means produces the indication only when the slit is positioned between it and the light source, in which the motor is a stepping motor having a plurality of equally spaced steps per revolution with there being a stable place between each step, in which the rotatable position is at one of the stable places, an end cover, means for mounting the light source and photo-responsive means mounted on the end cover and means for enabling rotational movement of the end cover to adjust the light source and photo-responsive means to provide the indication at a stable place.

11. The invention as defined in claim 10 in which the disk is secured on the shaft by clamping means having a clamping and a released condition and in which the disk is mounted for relative rotation on the shaft when the clamping means is in its released condition whereby the relative position of the disk on the shaft may be altered.

* * * * *